US010678846B2

(12) United States Patent
Gordo Soldevila et al.

(10) Patent No.: US 10,678,846 B2
(45) Date of Patent: Jun. 9, 2020

(54) INSTANCE-LEVEL IMAGE RETRIEVAL WITH A REGION PROPOSAL NETWORK

(71) Applicant: Xerox Corporation, Norwalk, CT (US)

(72) Inventors: Albert Gordo Soldevila, Grenoble (FR); Jon Almazan, Grenoble (FR); Jerome Revaud, Meylan (FR); Diane Larlus-Larrondo, La Tronche (FR)

(73) Assignee: Xerox Corporation, Norwalk, CT (US)

( * ) Notice: Subject to any disclaimer, the term of this patent is extended or adjusted under 35 U.S.C. 154(b) by 326 days.

(21) Appl. No.: 15/455,551

(22) Filed: Mar. 10, 2017

(65) Prior Publication Data

US 2018/0260415 A1 Sep. 13, 2018

(51) Int. Cl.
*G06K 9/62* (2006.01)
*G06F 16/583* (2019.01)
*G06K 9/46* (2006.01)
*G06K 9/32* (2006.01)
*G06N 3/08* (2006.01)
*G06N 3/04* (2006.01)
*G06K 9/00* (2006.01)

(52) U.S. Cl.
CPC ........ *G06F 16/5838* (2019.01); *G06F 16/583* (2019.01); *G06K 9/3233* (2013.01); *G06K 9/4628* (2013.01); *G06N 3/0454* (2013.01); *G06N 3/084* (2013.01); *G06K 9/00771* (2013.01)

(58) Field of Classification Search
CPC .. G06F 16/5838; G06N 3/084; G06N 3/0454; G06K 9/3233; G06K 9/4628
See application file for complete search history.

(56) References Cited

U.S. PATENT DOCUMENTS

| 7,519,200 B2* | 4/2009 | Gokturk | G06K 9/00375 |
| | | | 382/118 |
| 10,043,109 B1* | 8/2018 | Du | G06N 3/0454 |
| 10,109,051 B1* | 10/2018 | Natesh | G06K 9/4652 |
| 2004/0197013 A1* | 10/2004 | Kamei | G06K 9/00268 |
| | | | 382/118 |

(Continued)

OTHER PUBLICATIONS

Antol, et al.,"Vqa: Visual question answering," ICCV, pp. 2425-2433 (2015).

(Continued)

*Primary Examiner* — Solomon G Bezuayehu
(74) *Attorney, Agent, or Firm* — Fay Sharpe LLP (57) ABSTRACT

In a method for detecting an object in an input image, an input image vector representing the input image is generated by performing a regional maximum activations of convolutions (R-MAC) using a convolutional neural network (CNN) applied to the input image and using regions for the R-MAC defined by applying a region proposal network (RPN) to the output of the CNN applied to the input image. Likewise, a reference image vector representing a reference image depicting the object is generated by performing the R-MAC using the CNN applied to the reference image and using regions for the R MAC defined by applying the RPN to the output of the CNN applied to the reference image. A similarity metric between the input image vector and the reference image vector is computed, and the object is detected as present in the input image if the similarity metric satisfies a detection criterion.

14 Claims, 7 Drawing Sheets

(56) References Cited

U.S. PATENT DOCUMENTS

| | | | |
|---|---|---|---|
| 2011/0170781 A1* | 7/2011 | Bronstein | G06K 9/6289 |
| | | | 382/190 |
| 2013/0070996 A1* | 3/2013 | Liu | G06K 9/00 |
| | | | 382/131 |
| 2016/0155011 A1* | 6/2016 | Sulc | G06T 7/73 |
| | | | 382/103 |
| 2016/0292589 A1* | 10/2016 | Taylor, Jr. | G06F 16/1744 |
| 2016/0321784 A1* | 11/2016 | Annapureddy | G06K 9/66 |
| 2017/0206431 A1* | 7/2017 | Sun | G06N 3/084 |
| 2018/0373962 A1* | 12/2018 | Ye | G06K 9/6269 |
| 2019/0327501 A1* | 10/2019 | Walters | G06N 3/08 |

OTHER PUBLICATIONS

Arandjelovic, et al., "Three things everyone should know to improve object retrieval," CVPR, pp. 2911-2918 (2012).
Arandjelovic, et al., "CNN architecture for weakly supervised place recognition," CVPR. pp. 1-17 (2016).
Azizpour, et al., "Factors of trans-ferability for a generic convnet representation," IEEE Transactions on Pattern Analysis and Machine Intelligence, pp. 1-12 (2015).
Babenko, et al., "Aggregating deep convolutional features for image retrieval," ICCV, pp. 1269-1277 (2015).
Babenko, et al., "Neural codes for image retrieval," ECCV, pp. 584-599 (2014).
Chopra, et al., "Learning a similarity metric discriminatively, with application to face verification," Proc. of Computer Vision and Pattern Recognition Conference, pp. 1-8 (2005).
Chum, et al., "Total recall II: Query expansion revisited," in CVPR, pp. 889-896 (2011).
Chum, et al., "Total recall: Automatic query expansion with a generative feature model for object retrieval," ICCV, pp. 1-8 (2007).
Deng, et al., "Visual reranking through weakly supervised multi-graph learning," ICCV, pp. 2600-2607 (2013).
Frome, et al., "Devise: A deep visual-semantic embedding model," pp. 1-9 (2013).
Girshick. "Fast R-CNN," CVPR, pp. 1440-1448 (2015).
Girshick, et al., "Rich feature hierarchies for accu-rate object detection and semantic segmentation," CVPR, pp. 1-8 (2014).
Gong, et al., "Multi-scale orderless pooling of deep convolutional activation features," ECCV, pp. 392-407 (2014).
Gordo, et al., "Leveraging category-level labels for instance-level image retrieval," CVPR, pp. 1-8 (2012).
Hadsell, et al., "Dimensionality reduction by learning an in-variant mapping," CVPR, pp. 1-8 (2006).
He, et al., "Spatial pyramid pooling in deep convolutional networks for visual recognition," ECCV, pp. 1-14 (2014).
He, et al., "Deep residual learning for image recognition," CVPR, pp. 1-14 (2016).
Hoffer, et al., "Deep metric learning using triplet network," SIMBAD, pp. 1-8 (2015).
Hu, et al., "Discriminative deep metric learning for face verification in the wild," CVPR, pp. 1-8 (2014).
Jaderberg, et al., "Spatial transformer networks," NIPS, pp. 1-9 (2015).
Jégou, et al., "Aggregating local descriptors into a compact image representation," CVPR, pp. 1-8 (2010).
Jégou, et al., "Improving bag-of-features for large scale image search," IJCV, pp. 1-21 (2010).
Jégou, et al., "Negative evidences and co-occurrences in image retrieval: The benefit of PCA and whitening," ECCV 2012, pp. 1-14 (2012).
Jégou, et al., "Hamming embedding and weak geometric consistency for large scale image search," ECCV, pp. 1-14 (2008).
Jégou, et al., "Triangulation embedding and democratic aggregation for image search," CVPR, pp. 1-8 (2014).
Kalantidis, et al., "Cross-dimensional weighting for aggregated deep convolutional features," ECCV Workshop on Web-scale Vision and Social Media, pp. 685-701, (2016).
Karpathy, et al., "Deep fragment embeddings for bidirectional image-sentence mapping," pp. 1-9 (2014).
Krizhevsky, et al., "ImageNet classification with deep convolutional neural networks," NIPS, pp. 1-9 (2012).
Li, et al., "Pairwise geometric matching for large-scale object retrieval," CVPR, pp. 5153-5161 (2015).
Long, et al., "Fully convolutional networks for semantic segmentation," CVPR, pp. 3431-3440 (2015).
Lowe, et al. "Distinctive image features from scale-invariant keypoints," IJCV, pp. 1-28 (2004).
Mikolajczyk, et al., "Scale & affine invariant interest point detectors," IJCV, vol. 60, No. 1 pp. 63-86 (2004).
Mikul'Ik, et al., "Learning a fine vocabulary," ECCV, pp. 1-14 (2010).
Mikulik, et al., "Learning vocabularies over a fine quantization," IJCV, pp. 1-13 (2013).
Ng, et al., "Exploiting local features from deep networks for image retrieval," CVPR workshops, pp. 53-61 (2015).
Nister et al., "Scalable recognition with a vocabulary tree," CVPR, pp. 1-8 (2006).
Paulin, et al., "Local convolutional features with unsupervised training for image retrieval," ICCV, pp. 91-100 (2015).
Perdoch, et al., "Efficient representation of local geometry for large scale object retrieval," CVPR, pp. 1-8 (2009).
Perronnin, et al., "Fisher kernels on visual vocabularies for image categorization," CVPR, pp. 1-8 (2007).
Perronnin, et al., "Fisher vectors meet neural networks: A hybrid classification architecture," CVPR, pp. 3743-3753 (2015).
Perronnin, et al., "Large-scale image retrieval with compressed Fisher vectors," CVPR, pp. 1-8 (2010).
Philbin, et al., "Lost in quantization: Improving particular object retrieval in large scale image databases," CVPR, pp. 1-8 (2008).
Philbin, et al., "Descriptor learning for efficient Retrieval," ECCV, pp. 677-691 (2010).
Philbin, et al., "Object retrieval with large vocabularies and fast spatial matching," CVPR, pp. 1-8, (2007).
Qin, et al., "Hello neighbor: accurate object retrieval with k-reciprocal nearest neighbors," CVPR, pp. 777-784 (2011).
Radenovic, et al., "CNN image retrieval learns from BoW: Unsupervised fine-tuning with hard examples," ECCV, pp. 1-17 (2016).
Radenovic, et al., "Multiple measurements and joint dimensionality reduction for large scale image search with short vectors-extended version," Intl Conf. on Multimedia Retrieval, arXiv: 1504.03285v1, pp. 1-9 (2015).
Razavian, et al., "Visual Instance Retrieval with Deep Convolutional Networks," ITE Transactions on Media Technology and Applications, pp. 1-8 (2016).
Razavian, et al., "CNN features off-the-shelf: an astounding baseline for recognition," CVPR Deep Vision Workshop, pp. 806-813 (2014).
Ren, et al., "Faster R-CNN: Towards real-time object detection with region proposal networks," NIPS, pp. 1-9 (2015).
Russakovsky, et al., "ImageNet Large Scale Visual Recognition Challenge," IJCV, pp. 1-43 (2015).
Schroff, et al., "Facenet: A unified embedding for face recognition and clustering," CVPR, pp. 815-823 (2015).
Simonyan, et al., "Very deep convolutional networks for large-scale image recognition," ICLR 2015, pp. 1-14 (2015).
Simo-Serra, et al., "Discriminative learning of deep convolutional feature point descriptors," ICCV, pp. 118-126 (2015).
Song, et al., "Deep metric learning via lifted structured feature embedding," CVPR, pp. (2016).
Sun, et al., "Deep learning face representation by joint identification-verification," NIPS, pp. 1-9 (2014).
Tao, et al., "Locality in generic instance search from one example," CVPR, pp. 1-8 (2014).
Tolias, et al., "Image search with selective match kernels: Aggregation across single and multiple images," IJCV, pp. 1-13 (2015).
Tolias et al., "Visual query expansion with or without geometry: refining local descriptors by feature aggregation," Pattern Recognition, pp. 1-12(2015).

(56) References Cited

OTHER PUBLICATIONS

Tolias et al., Particular Object Retrieval With Max-Pooling of CNN Activations, ICLR, available as arXiv:1511.05879v2, pp. 1-12 (2016).
Vardi, et al., "The multivariate L1-median and associated data depth," Proceedings of the National Academy of Sciences, vol. 97, No. 4, pp. 1423-1426 (2004).
Wang, et al., "Learning fine-grained image similarity with deep ranking," CVPR, pp. 1-8 (2014).
Weinberger, et al., "Distance metric learning for large margin nearest neighbor classification," JMLR, vol. 10, pp. 207-244 (2009).

* cited by examiner

INSTANCE-LEVEL IMAGE RETRIEVAL WITH A REGION PROPOSAL NETWORK

BACKGROUND

The following relates to the instance retrieval arts, video identification arts, object tagging arts, and related arts.

Instance-level image retrieval refers to the process of detecting images that contain an instance of an object (for example, a person, a vehicle, or so forth) pictured in a reference image. As used herein, the object may in general be a visual depiction of a physical object, a person (or a person's face in a facial recognition context), a building, or other visualized entity of interest. In a computer-generated imagery (CGI) context, the object may be a computer-generated object. These are merely illustrative examples.

Instance retrieval finds application in numerous image processing devices and methods. For example, instance retrieval may be used in a security camera device to implement facial recognition, e.g. to locate images captured by the security camera that show a suspect pictured in a reference image. In a video surveillance camera device, instance-level retrieval may be used to identify image frames of a video stream that capture instances of a person, vehicle, or the like shown in a reference image, so as to determine when the person, vehicle, or so forth was seen by the video surveillance camera.

BRIEF DESCRIPTION

In some embodiments disclosed herein, an image processing device is disclosed, which comprises an electronic processor and a non-transitory storage medium operatively connected with the electronic processor and storing instructions readable and executable by the electronic processor to perform a method for detecting an object in an input image. The performed method includes the following. An input image vector representing the input image is generated by operations including applying a convolutional neural network (CNN) to the input image to generate an input image CNN response map, defining regions of the input image CNN response map by applying a region proposal network (RPN) to the input image CNN response map, generating a region vector representing each region of the input image CNN response map, and sum-aggregating the region vectors representing the regions of the input image CNN response map. Likewise, a reference image vector representing a reference image depicting the object is generated by operations including applying the CNN to the reference image to generate a reference image CNN response map, defining regions of the reference image CNN response map by applying the RPN to the reference image CNN response map, generating a region vector representing each region of the reference image CNN response map, and sum-aggregating the region vectors representing the regions of the reference image CNN response map. A similarity metric between the input image vector and the reference image vector is computed, and the object is detected as present in the input image if the similarity metric satisfies a detection criterion.

In some embodiments disclosed herein, a non-transitory storage medium stores instructions readable and executable by an electronic processor to perform a method for detecting an object in an input image. The method includes the following. An input image vector representing the input image is generated by performing a regional maximum activations of convolutions (R-MAC) using a convolutional neural network (CNN) applied to the input image and using regions for the R-MAC defined by applying a region proposal network (RPN) to the output of the CNN applied to the input image. Likewise, a reference image vector representing a reference image depicting the object is generated by performing the R-MAC using the CNN applied to the reference image and using regions for the R MAC defined by applying the RPN to the output of the CNN applied to the reference image. A similarity metric between the input image vector and the reference image vector is computed, and the object is detected as present in the input image if the similarity metric satisfies a detection criterion.

In some embodiments disclosed herein, a method is disclosed for detecting an object in an input image. The method includes the following. An input image vector representing the input image is generated by performing a regional maximum activations of convolutions (R-MAC) on the input image with regions defined by applying a region proposal network (RPN) to a convolutional neural network (CNN) response map generated during the performance of the R MAC on the input image. Likewise, a reference image vector representing a reference image depicting the object is generated by performing the R-MAC on the reference image with regions defined by applying the RPN to a CNN response map generated during the performance of the R-MAC on the reference image. A similarity metric between the input image vector and the reference image vector is computed, and the object is detected as present in the input image if the similarity metric satisfies a detection criterion. The generating of the input image vector, the generating of the reference image vector, the computing of the similarity metric, and the detecting of the object in the input image are suitably performed by an electronic processor.

DETAILED DESCRIPTION

Image retrieval techniques disclosed herein are based on the regional maximum activations of convolutions (R-MAC) approach. See, e.g. Tolias et al., Particular Object Retrieval With Max-Pooling of CNN Activations" (ICLR 2016). R-MAC aggregates several image regions into a compact feature vector of fixed length which is therefore robust to scale and translation. This representation can deal with high resolution images of different aspect ratios.

It is recognized herein that all the steps involved to build the R-MAC representation are differentiable, and so its weights can be learned in an end-to-end manner. Thus, a learning approach such as a three-stream Siamese network can be used to explicitly optimize the weights of the R-MAC representation for the image retrieval task by using a triplet ranking loss. In an illustrative example described herein, to train the network a training dataset was constructed by querying image search engines with names of different landmarks. This approach produces a training set with a large fraction of mislabeled and false positive images. A further improvement disclosed herein is to employ an automatic cleaning process, such that learning on the cleaned training data significantly improves.

It is further disclosed herein to learn a pooling mechanism for the R-MAC descriptor. Instead of a rigid grid for determining the location of regions that are pooled together, in approaches disclosed herein the locations of these regions are predicted based on the image content. A region proposal network (RPN) is trained, with bounding boxes that are estimated for the training images as a by-product of the cleaning process. It was found in experiments that the disclosed combination of R-MAC with the RPN for choosing the regions significantly outperformed R-MAC using a rigid grid.

Figure 1:
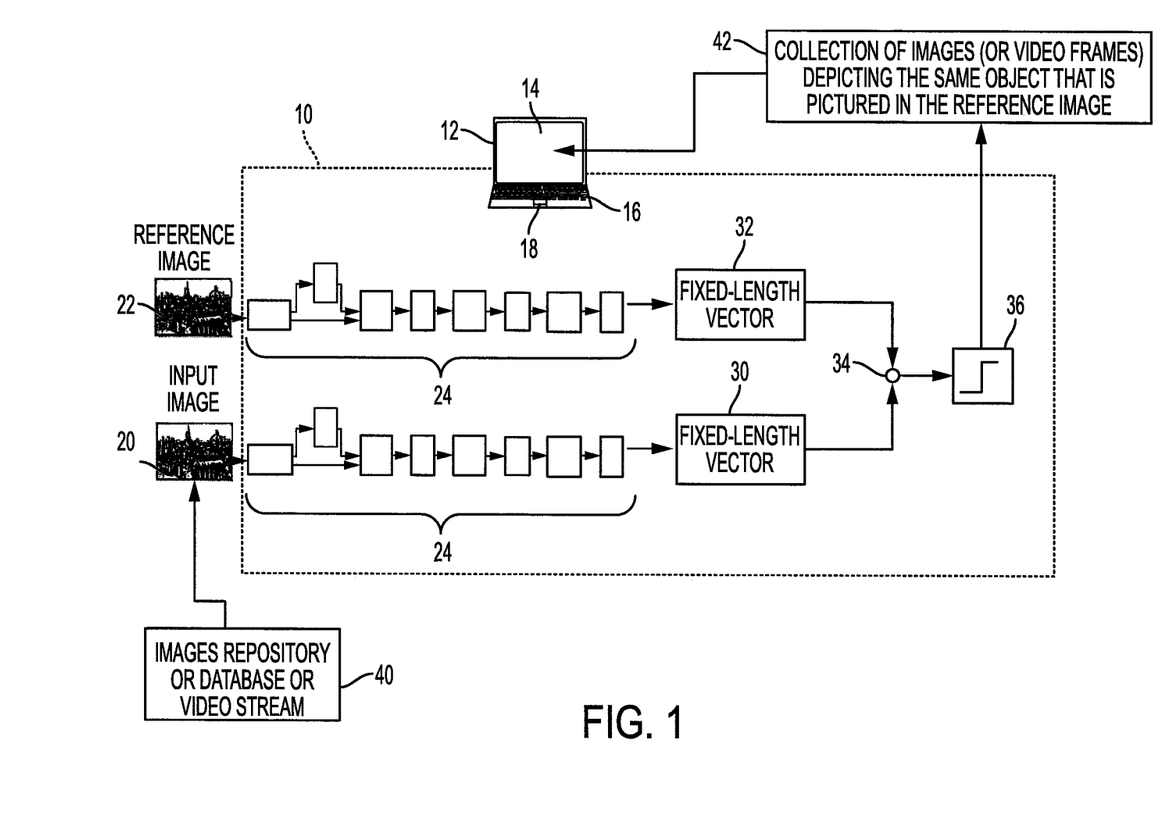
FIG. 1 diagrammatically illustrates an image retrieval device for detecting images that depict an object of interest (e.g. physical object, a person, a virtual reality object, et cetera).

The disclosed approach produces an image retrieval architecture that encodes an image into a compact fixed-length vector in a single forward pass. The generation of the vector representing the image is thus performed as a single forward pass through the CNN and RPN, and does not include any back-propagation. Representations of different images can be then compared using a dot-product or other similarity metric between the vectors representing the images. In an illustrative embodiment, at training time image triplets are sampled and simultaneously considered by a triplet-loss, which is used to update the weights of the network via backpropagation. A region proposal network (RPN) learns which image regions should be pooled. When the trained R-MAC/RPN is applied for image retrieval, a query image is fed to the learned architecture to efficiently produce a compact global image representation that can be compared with the dataset image representations with a simple dot-product or other vector similarity metric:

With reference to FIG. 1, an image retrieval device 10 is implemented as a computer or other electronic processing device 12 including a microprocessor, microcontroller, or other electronic processor (not shown). The illustrative computer 12 includes a display 14 and one or more user input devices such as an illustrative keyboard 16 and an illustrative trackpad 18 or other pointing device (e.g. mouse, trackball, a touch-sensitive overlay of the display 14, or so forth). The computer 12 or other device including the electronic processor is operatively connected with (e.g. includes or is connected with via a wired or wireless connection) a non-transitory storage medium (not shown) which stores instructions readable and executable by the electronic processor 12 to perform a method for detecting an object in an input image 20 by comparing the input image 20 with a reference image 22 depicting the object. The non-transitory storage medium may, for example, comprise one or more of: an internal hard disk drive of the computer 12, an external hard drive, a network-accessible hard drive or other magnetic storage medium; a solid state drive (SSD) of the computer 12 or other electronic storage medium; an optical disk or other optical storage medium; various combinations thereof; or so forth. The computer 12 is programmed by instructions on the non-transitory storage medium to implement an image processing network 24 that processes an image to generate a corresponding image vector that represents the image. More particularly, the computer 12 is programmed by instructions on the non-transitory storage medium to generate an input image vector 30 representing the input image 20 by applying the image processing network 24 to the input image; and to likewise generate a reference image vector 32 representing the reference image 22 by applying the (same) image processing network 24 to the reference image 22. The two image vectors 30, 32 are of the same fixed length, and are compared by computing a similarity metric 34 between the input image vector 30 and the reference image vector 32, and detecting the object in the input image 20 if the similarity metric satisfies a detection criterion 36. In the illustrative examples, the similarity metric 34 is a dot product and the object is detected as present in the input image 20 if the dot product satisfies a detection criterion 36 comprising the dot product being greater than a threshold. Other similarity metrics are contemplated, such as a Euclidean distance or other distance metric between the two image vectors 30, 32. In the case of a distance being the similarity metric 34, the detection criterion 36 would suitably be an upper threshold, i.e. the object would be detected as present in the input image if the distance is less than some threshold.

The image retrieval device 10 may be used in various ways and for various types of applications. In illustrative FIG. 1, the input image 20 is drawn from a repository 40 of images in a database or video stream (in which case the images are video frames) which is to be searched for instances of the object of interest, and the image retrieval device 10 processes successive input images in turn to identify a collection 42 of images (or video frames) depicting the same object as is shown in the reference image 22. Although not illustrated in FIG. 1, it is contemplated to employ two or more reference images so as to capture depictions of the object of interest in different (possibly mutually exclusive) vantage points, e.g. showing a physical object of interest from the front, back, and possibly one or more side views, and the image retrieval device 10 is applied to compare the input image 20 with each such reference image in turn—an instance match is found if the input image 20 matches any one of these different reference "views" of the object of interest. The collection 42 of images depicting instances of the object of interest may be used in various ways. For example, if the image retrieval device 10 is employed in conjunction with a surveillance camera, the object of interest may be a person (in a location where no one should be present, e.g. a closed retail store). In this application the collection of input images 40 is suitably the video stream from a surveillance camera and a detected instance (i.e. a frame depicting a person) is then displayed on the display 14 of a security monitor in a security guard station. In the case of a facial recognition task, the image collection 40 may be a single image or a video stream of images taken by a camera at an entryway, and a detected instance in this case corresponds to matching an input image with a reference image taken of the face of an authorized person. Here the generation of a detected image 42 depicting the authorized person may automatically trigger the unlocking of a controlled security door or the like, or may automatically log the person into a secure computing device, or so forth. As yet another non-limiting illustrative example, the image retrieval device 10 may be employed in conjunction with a parking garage camera that images the license plate of a vehicle approaching the entry gate to the garage. In this case the image collection 40 may be a single image or a video stream of images taken by an entry gate camera, and a detected instance in this case corresponds to matching an input image with a reference image taken of the license plate of a vehicle that is paid up and authorized to park in the parking garage. Here the generation of a detected image 42 depicting an authorized license plate may automatically trigger lifting of the entry gate to admit the authorized vehicle. These are merely non-limiting illustrative examples.

Figure 2:
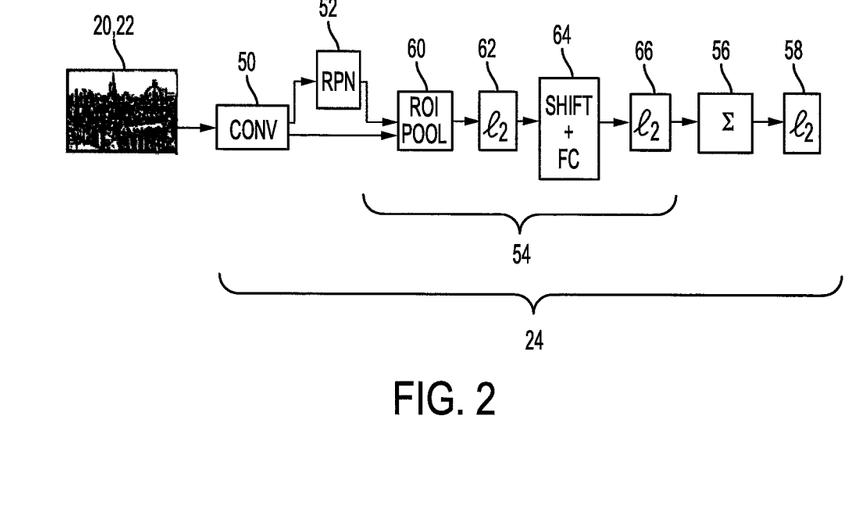
FIG. 2 diagrammatically shows the image processing network of the image retrieval device of FIG. 1 that generates a fixed-length image vector representing an image.

With reference now to FIG. 2, the image processing network 24 of the image retrieval device 10 of FIG. 1 that generates a fixed-length image vector representing an image is described. The image processing network 24 applies a convolutional neural network (CNN) 50 to the image (either the input image 20 or the reference image 22) to generate an input image CNN response map. A region proposal network (RPN) 52 is applied to the CNN response map output by the CNN 50 to define regions of the image. Processing 54 is applied to each region to generate a corresponding region vector representing the region of the input image CNN response map. (Said another way, the processing 54 is applied in parallel to each region of the CNN response map). The region vectors representing the regions of the input image CNN response map are sum-aggregated by a sum-aggregation operation 56, and the sum is optionally normalized, e.g. using an $l_2$ normalization 58, to generate the final image vector representing the image. In the illustrative example, the processing 54 to generate each region vector includes max pooling 60 of activation features in the corresponding region of the CNN response map, with an optional normalization, e.g. an $l_2$ normalization 62, followed by whitening 64, 66 of the output of the max-pooling. The illustrative whitening 64, 66 includes performing principal component analysis (PCA) 64 followed by an $l_2$ normalization 66; more generally, another non-linear transform may be applied to the max pooling result to produce the regional maximum activation.

The image processing network 24 can be implemented to perform a regional maximum activations of convolutions (R-MAC, see, e.g. Tolias et al., Particular Object Retrieval With Max-Pooling of CNN Activations" (ICLR 2016)) using the CNN 50 applied to the image (either input image 20 or reference image 22). The R-MAC is modified as disclosed herein in certain ways, including by using regions for the R-MAC defined by applying the RPN 52 to the output of the CNN 50 applied to the image. The R-MAC aggregates several image regions into a compact feature vector of fixed length which is therefore robust to scale and translation. In R-MAC, the convolutional layers of a pre-trained network (e.g. CNN 50) are used to extract activation features from the images which form a CNN response map, which can be understood as local features that do not depend on the image size or its aspect ratio. These local features are max-pooled 60 in different regions of the image. While conventional R-MAC uses a multi-scale rigid grid of regions with overlapping cells, the disclosed image processing network 24 instead uses the regions defined by the RPN 52 applied to the CNN response map output by the CNN 50. These pooled region features are independently $l_2$-normalized 62, whitened with PCA 64 and $l_2$-normalized 66 again (or, more generally, some other non-linear whitening transform is applied). In R-MAC (unlike spatial pyramids which concatenate the region descriptors), the region descriptors are sum-aggregated 56 and $l_2$-normalized 58, producing a compact vector of fixed length whose size (typically 256-512 dimensions) is independent of the number of regions in the image. Various modifications of the illustrative image processing network 24 are contemplated, e.g. using another non-linear whitening transform, and/or another normalization, or so forth. Comparing two image vectors with the illustrative dot-product 34 or another similarity metric can then be interpreted as an approximate many-to-many region matching.

It is recognized herein that all these operations are differentiable. In particular, the spatial pooling 60 in different regions is equivalent to the Region of Interest (ROI) pooling, which is differentiable. The PCA projection 64 can be implemented with a shifting and a fully connected (FC) layer, as indicated in FIG. 2, while the gradients of the sum-aggregation 56 of the different regions and the $l_2$-normalization operations 62, 66, 58 are also straightforward to compute. Therefore, the image processing network 24 can be implemented as a network architecture that, given an image (e.g. input image 20 or reference image 22) and the coordinates of its regions (from the RPN 52, these depend on the image size), operates on the image to generate the final fixed-length image vector (e.g., input image vector 30 or reference image vector 32) in a single forward pass. During application of the trained image processing network 24 no backpropagation is performed.

On the other hand, backpropagation through the network architecture can be employed during training to learn the optimal weights of the CNN 50 and the projection 64. In principle, the weights of the CNN 50 and PCA 64 could be trained simultaneously with weights of the regions-defining RPN 52. However, it was found that correctly weighting both the R-MAC components 50, 64 and the RPN 52 was difficult and typically led to unstable results.

Figure 3A:
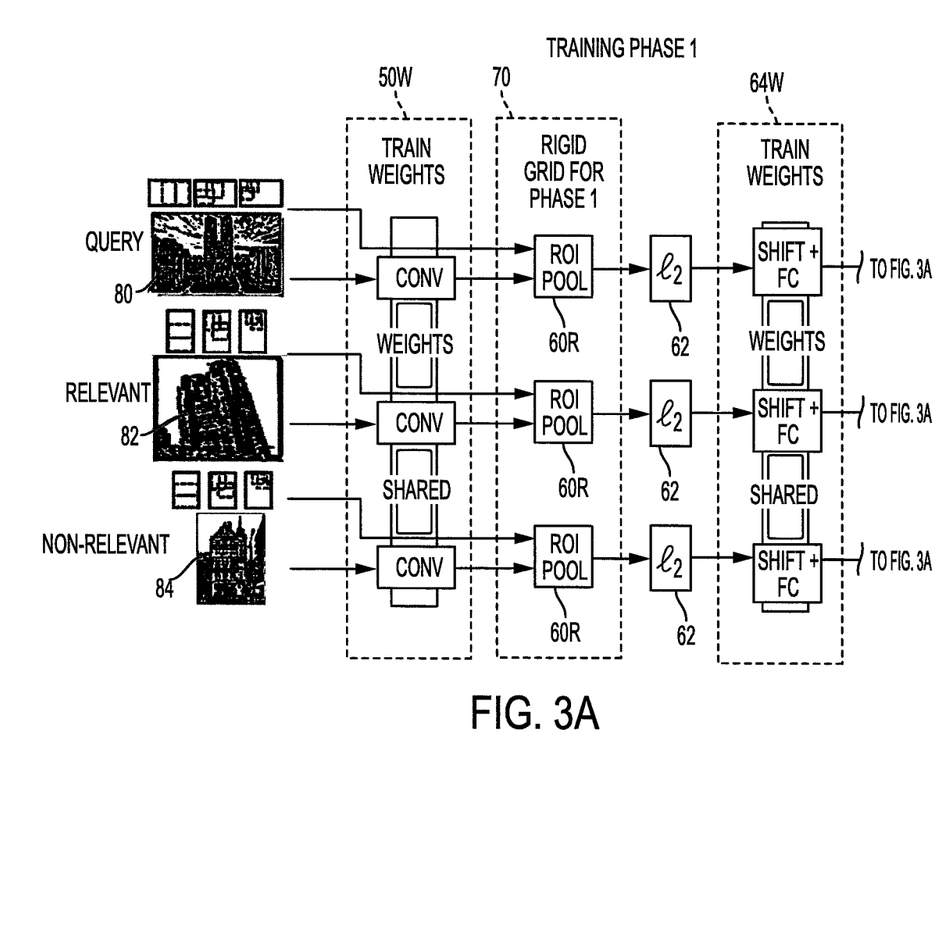
FIGS. 3A and 3B diagrammatically show a first training phase which operates to train the regional maximum activations of convolutions (R-MAC) convolutional layers of the image processing network of FIG. 2.
Figure 3B:
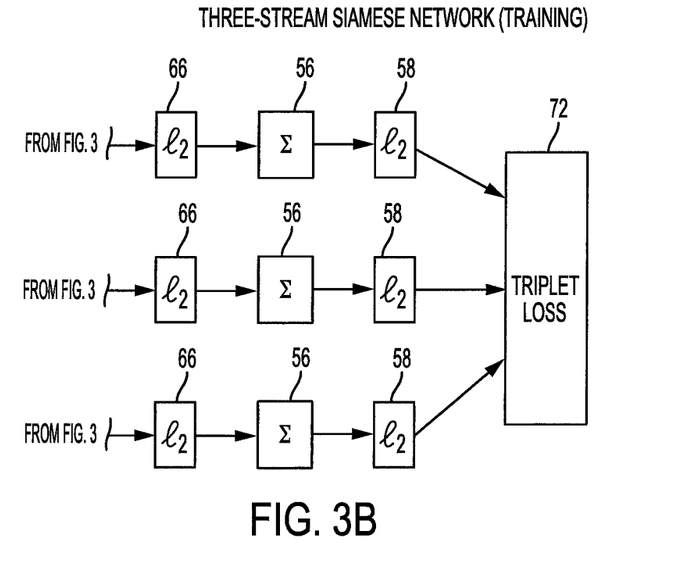
Figure 4:
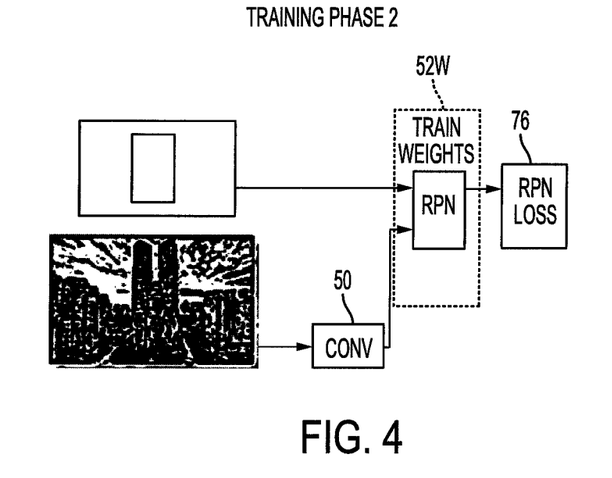
FIG. 4 diagrammatically shows a second training phase which operates to train the region proposal network (RPN) of the image processing network of FIG. 2.

With reference to FIGS. 3 and 4, in a more robust illustrative training approach the R-MAC representation is trained in a first training phase (FIGS. 3A and 3B) using a rigid grid 70. This includes training weights 50W of the CNN 50 and weights 64W of the PCA 64. Thereafter, in a second training phase (FIG. 4) the trained CNN 50 is held fixed while learning weights 52W of the RPN 52, which thereafter replaces the rigid grid 70 used in the first training phase (FIGS. 3A and 3B) to form the completely trained image processing network 24 of the image retrieval device 10 of FIG. 1.

With particular reference now to FIGS. 3A and 3B, training of the R-MAC with the fixed regions 70 is described in further detail. The illustrative approach employs a ranking loss 72 based on image triplets. It explicitly enforces that, given a query image 80, a relevant image 82 that is relevant to the query image, and a non-relevant image 84 that is not relevant to the query image, the relevant image 82 is closer to the query image 80 than is the non-relevant image 84. To do so, a three-stream Siamese network is employed in which the weights 50W, 64W of the streams are shared. The number and size of the weights in the network (the convolutional filters and the shift and projection) is independent of the size of the images 80, 82, 84, and each stream of the Siamese network can be fed with images of different sizes and aspect ratios.

Let $I_q$ be a query image with R-MAC descriptor q, $I^+$ be a relevant image with descriptor $d^+$, and $I^-$ be a non-relevant image with descriptor $d^-$. We define the ranking triplet loss as:

$$L(I_q, I^+, I^-) = \frac{1}{2}\max(0, m + \|q - d^+\|^2 - \|q - d^-\|^2) \quad (1)$$

where m is a scalar that controls the margin. Given a triplet with non-zero loss, the gradient is back-propagated through the three streams of the network, and the convolutional layers together with the PCA layers—the shifting and the fully connected layer—get updated. This illustrative training approach offers certain advantages. It directly optimizes a ranking objective, and the network can be trained using images at the same (preferably high) resolution as the images 20 that are to be tested for retrieval. Further, the learning of the optimal PCA weights 64W can be seen as a way to perform discriminative large-margin metric learning of a new space where relevant images are closer.

The use of a rigid grid in conventional R-MAC to pool regions endeavors to ensure that the object of interest is covered by at least one of the regions. However, this uniform sampling poses two problems. First, as the grid is independent of the image content, it is unlikely that any of the grid regions accurately align with the object of interest. Second, many of the regions only cover background. This is problematic as the comparison between R-MAC signatures can be seen as a many-to-many region matching: image clutter will negatively affect the performance. Note that both problems are coupled: increasing the number of grid regions improves the coverage, but also the number of irrelevant regions.

In the illustrative image processing network 24, the conventional rigid grid is replaced by regions defined by the Region Proposal Network (RPN) 52 which is trained to localize regions of interest in images. A suitable embodiment of the RPN 52 is described in Ren et al., "Faster R-CNN: Towards Real-Time Object Detection with Region Proposal Networks", in NIPS (2015). The RPN 52 of the image processing network 24 is a fully-convolutional network built on top of the CNN 50 of the R-MAC, as seen in FIG. 2. This allows one to get the region proposals at low computational cost. By using the RPN 52 instead of the conventional rigid grid, both problems of the rigid grid are overcome. First, the region proposals defined by the RPN 52 typically cover the object of interest more tightly than the rigid grid. Second, even if they do not overlap exactly with the region of interest, most of the proposal regions do overlap significantly with it, which means that increasing the number of proposals per image not only helps to increase the coverage but also helps in the many-to-many matching.

The RPN 52 predicts, for a set of candidate boxes of various sizes and aspects ratio, and at all possible image locations, a score describing how likely each box contains an object of interest. Simultaneously, for each candidate box it performs regression to improve its location. This is achieved by a fully-convolutional network consisting of a first layer that uses 3×3 filters, and two sibling convolutional layers with 1×1 filters that predict, for each candidate box in the image, both the "objectness" score and the regressed location. Non-maximum suppression is then performed on the ranked boxes to produce k final proposals per image that are used in place of the conventional rigid grid.

With reference to FIG. 4, an illustrative approach for training the weights 52W of the RPN 52 is described. In this RPN training approach, a binary class label is assigned to each candidate box, depending on how much the box overlaps with the ground-truth region of interest, and an objective function is minimized. The illustraitve objective function has a multi-task loss 76 that combines a classification loss (log loss over object versus background classes) and a regression loss (smooth $l_1$). This is then optimized by backpropagation and a suitable iterative optimization algorithm such as stochastic gradient descent (SGD). See, e.g. Ren, supra.

The trained image processing network 24 is applied to an image, and the RPN 52 produces the region proposals, pools the features inside the regions, embeds them into a more discriminative space, aggregates them, and normalizes them. All these operations happen in a single forward pass through the image processing network 24, without any backpropagation. The image processing network 24 is efficient: for example, approximately 5 high-resolution (i.e. 724 pixels for the largest side) images can be encoded to corresponding image vectors per second using a single Nvidia K40 GPU.

In the following, some illustrative experiments are described.

To train the image processing network 24 for instance-level image retrieval, a large-scale image dataset was used, namely the Landmarks dataset. See Babenko et al., "Neural codes for image retrieval", in ECCV (2014). The Landmarks dataset contains approximately 214,000 images of 672 famous landmark sites. Its images were collected through textual queries in an image search engine without thorough verification. As a consequence, they comprise a large variety of profiles: general views of the site, close-ups of details like statues or paintings, with all intermediate cases as well, but also site map pictures, artistic drawings, or even completely unrelated images. A subset of images were downloaded (limited by availability due to broken URLs). After manual inspection, some classes were merged together due to partial overlap, and classes with too few images were removed. All classes having an overlap with the Oxford 5k, Paris 6k, and Holidays datasets (on which other experiments were performed) were removed. The resulting dataset included a set of about 192,000 images divided into 586 landmarks. This is referred to herein as the Landmarks-full dataset. For experiments, 168,882 images were used for the training, and the 20,668 remaining images were used to validate parameters.

The Landmarks dataset has a large intra-class variability, with a wide variety of views and profiles, and a non-negligible amount of unrelated images. While this is generally not a problem for classification tasks, for instance-level matching the network should be trained with images of the same particular object or scene. In this case, variability comes from different viewing scales, angles, lighting conditions and image clutter. The Landmarks dataset was pre-processed, i.e. cleaned, to achieve this as follows. A strong image matching baseline was first run within the images of each landmark class. Each pair of images was compared using invariant keypoint matching and spatial verification, using SIFT and Hessian-Affine keypoint detectors and match keypoints using the first-to-second neighbor ratio rule. Afterwards, all matches were verified with an affine transformation model. This extensive procedure is affordable as it is performed offline only once at training time.

Without loss of generality, the rest of the cleaning procedure is described for a single landmark class, but was repeated for each class. Once a set of pairwise scores between all image pairs was obtained, a graph was constructed whose nodes are the images and edges are pairwise matches. All edges which have a low score were pruned. Then the connected components of the graph were extracted: they correspond to different profiles of a landmark. Only the largest connected component was retained, and the rest was discarded. This cleaning process left about 49,000 images (divided in 42,410 training and 6382 validation images) still belonging to one of the 586 landmarks. This cleaned training dataset is referred to herein as Landmarks-clean.

The training of the RPN 52 is possible thanks to the cleaning process of the data (i.e. the Landmarks-clean dataset). The ROI generator was trained using bounding box annotations that were automatically estimated for all landmark images. To that aim the data obtained during the cleaning step was leveraged. The position of verified keypoint matches is a meaningful cue since the object of interest is consistently visible across the landmark's pictures, whereas distractor backgrounds or foreground objects are varying and hence unmatched. The union of the connected components from all landmarks is denoted as a graph $\mathcal{S} = \{\mathcal{V}_S, \mathcal{E}_S\}$. For each pair of connected images $(i,j) \in \mathcal{E}_S$, there is a set of verified keypoint matches with a corresponding affine transformation $A_{ij}$. An initial bounding box is first defined in both images i and j, denoted by $B_i$ and $B_j$, as the minimum rectangle enclosing all matched keypoints. Note that a single image can be involved in many different pairs. In this case, the initial bounding box is the geometric median of all boxes, efficiently computed as described in Vardi et al., "The multivariate L1-median and associated data depth", in Proceedings of the National Academy of Sciences (2004). Then, a diffusion process was run, in which for a pair (i,j) the bounding box $B_j$ is predicted using $B_i$ and the affine transform $A_{ij}$ (and conversely). In the diffusion process, the bounding box from one image is projected into its graph neighbors using the affine transformations, and the current bounding box estimates are then updated accordingly. The diffusion process repeats through all edges until convergence. At each iteration, bounding boxes are updated as: $B_j' = (\alpha-1)B_j + \alpha A_{ij}B_i$, where $\alpha$ is a small update step ($\alpha$=0.1 in experiments reported herein). Again, the multiple updates for a single image are merged using geometric median, which is robust against poorly estimated affine transformations. This process iterates until convergence. It was found that the locations of the bounding boxes were improved by this process, as well as their consistency across images.

In the following, some experimental results produced by the described cleaning and training are presented. Experiments were performed on five standard datasets. The first two are the Oxford 5k building dataset (Philbin et al., "Object retrieval with large vocabularies and fast spatial matching" in CVPR 2007) containing 5,062 images, and the Paris 6k dataset (Philbin et al., "Lost in quantization: Improving particular object retrieval in large scale image databases", in CVPR 2008) containing 6,412 images. For both datasets there are 55 query images, each annotated with a region of interest. To test instance-level retrieval on a larger-scale scenario, the Oxford 105k and the Paris 106k datasets were used, which respectively extend Oxford 5k and Paris 6k with 100k distractor images from Philbin et al., "Object retrieval with large vocabularies and fast spatial matching" in CVPR 2007. Finally, the INRIA Holidays dataset (Jegou et al., "Hamming embedding and weak geometric consistency for large scale image search" in ECCV 2008) is composed of 1,491 images and 500 different scene queries. For all datasets standard evaluation protocols were used, and the mean Average Precision (mAP) is reported. As is standard practice, in Oxford and Paris one uses only the annotated region of interest of the query, while for Holidays one uses the whole query image. Furthermore, the query image is removed from the dataset when evaluating on Holidays, but not on Oxford or Paris.

The reported experiments used the very deep network (VGG16) (Simonyan et al., "Very deep convolutional networks for large-scale image recognition" in ICLR (2015)) pre-trained on the ImageNet ILSVRC challenge as a starting point. All further learning was performed on the Landmarks dataset unless otherwise noted. To perform fine-tuning with classification (see Babenko et al., "Neural codes for image retrieval" in ECCV 2014) the images were resized to multiple scales (shortest side in the [256-512] range) and random crops of 224×224 pixels were extracted. This fine-tuning process took approximately 5 days on a single Nvidia K40 GPU. When performing fine-tuning with the ranking loss, hard triplets should be mined in an efficient manner, as random triplets will mostly produce easy triplets or triplets with no loss. As a suitable approach, a forward pass was first performed on approximately ten thousand images to obtain their representations. The losses of all the triplets involving those features (with margin m=0.1) was then computed, which is fast once the representations have been computed. Finally, triplets with a large loss were sampled, which can be seen as hard negatives. These were used to train the network with SGD with momentum, with a learning rate of $10^{-3}$ and weight decay of $5\times10^{-5}$. To perform batched SGD the gradients of the backward passes were accumulated and the weights were updated only every n passes, with n=64 in the reported experiments. To increase efficiency, new hard triplets were mined only every 16 network updates. Following this process, approximately 650 batches of 64 triplets could be processed per day on a single K40 GPU. Approximately 2000 batches in total were processed, taking about 3 days of training. To learn the RPN 52, the network was trained for 200,000 iterations with a weight decay of $5\times10^{-5}$ and a learning rate of $10^{-3}$, which is decreased by a factor of 10 after 100,000 iterations. This process took less than 24 hours.

Retrieval experiments were performed for baselines techniques and the disclosed ranking loss-based approach. It was found that the previously described training data set cleaning process provided only marginal improvement in the case of baseline techniques employing classification. However, for the disclosed image processing network 24 applied for instance detection, it was found that the cleaning substanially improved the training of the Siamese network (FIG. 3B), as the triplet-based training process is less tolerant to outliers as compared with classifier training.

Figure 5:
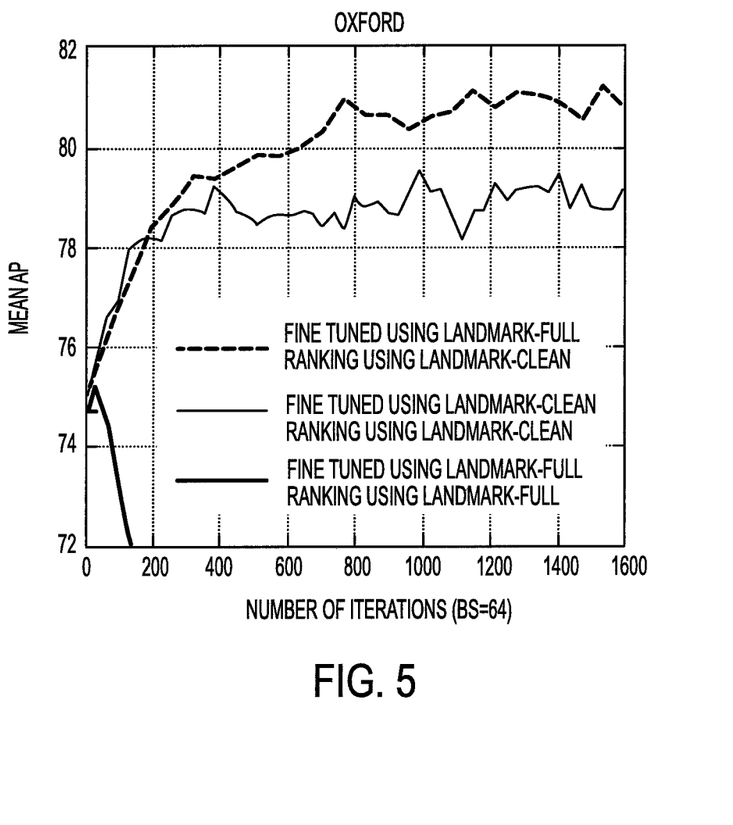
FIGS. 5 and 6 present experimental results as described herein.

With reference to FIG. 5, this is illustrated by experimental results, namely plotting the mAP obtained on Oxford 5k at several training epochs for different settings of the training process which employed initial fine-tuning by classification followed by training of the Siamese network of FIG. 3B. In FIG. 5, the notation BS=64 indicates "batch size", i.e. each batch included 64 triplets. The experiments presented in FIG. 5 relate to Training Phase 1 of FIG. 3A, and accordingly employed the rigid grid 70. The tested settings included: (1) fine-tuning using Landmark-Full followed by training of the Siamese network using Landmark-Full; (2) fine-tuning using Landmark-Full followed by training of the Siamese network using Landmark-Clean; and (3) fine-tuning using Landmark-Clean followed by training of the Siamese network using Landmark-Clean. It is seen that employing only the full dataset, i.e. setting (1) listed above, provides poor results (i.e. very low mAP values). Also, although not plotted in FIG. 5 it was found that omitting the initial fine-tuning by classification step produced poorer results. Interestingly, it was further found (as shown in FIG. 5) that initializing the network with a model that was first fine-tuned for classification on the full landmarks dataset provided better results than initializing by first fine-tuning for classification on the clean landmarks dataset. Without being limited to any particular theory of operation, it is believed that the model initialized using the full Landmark dataset has seen more diverse images so its weights are a better starting point. Advantageously, the experiments found that after fine-tuning, no noticeable difference in accuracy was found between image sizes of 1024 pixels and 724 pixels. Accordingly, all further experiments resized images to 724 pixels, significantly speeding up the image encoding and training.

Figure 6:
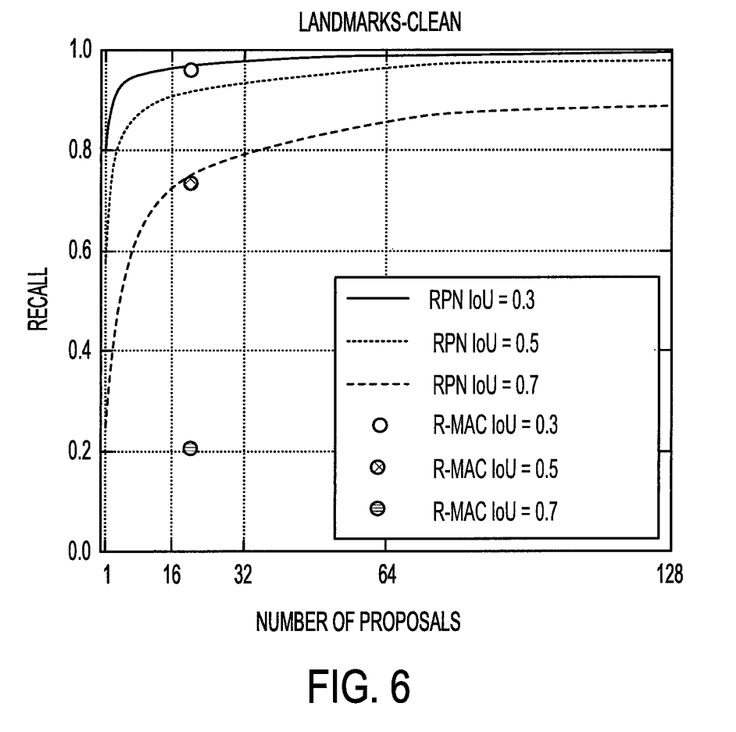

With reference to FIG. 6, results of further experiments are presented, which were directed to Training Phase 2 shown in FIG. 4 in which the RPN 52 is trained. The results of FIG. 6 show the detection recall obtained in the validation set of Landmarks-Clean for different IoU (intersection over union) levels as a function of the number of proposals (i.e. the number of defined regions, shown as plotted curves), and compares it with the recall obtained by the rigid grid of R-MAC (shown as plotted data points). The use of the RPN 52 provides significantly higher recall than the rigid grid even when the number of regions is small. This is consistent with the quantitative results (not shown), where 32-64 proposals already outperform the rigid regions. Visualizations of the proposal locations as heat-map representations on a representative selection of sample images of Landmarks and Oxford 5k showed that the proposals were centered around the objects of interest. For the Oxford 5k images, the query boxes were somewhat arbitrarily defined—in this case, as expected, the defined proposal regions aligned with the entire landmark in a query-agnostic way.

Results for retrieval performance are presented in Table 1, which presents mAP results for retrieval on the Oxford 5k and Paris 6k data sets. In these experiments, the following two Training Phase 1 implementations were tested: (1) only the initial fine-tuning by classification on the Landmarks-Full training dataset ("C-Full"); and (2) the initial fine-tuning by classification on the Landmarks-Full training dataset followed by fine-tuning by ranking using the Siamese network ("C-Full; R-Clean"). Phase 2 was performed with the RPN 52 defining 16, 32, 64, and 128 regions in various experiments, as well as a baseline experiment using a rigid grid in place of the RPN 52. It is seen in Table 1 that the use of proposals by the RPN 52 improves over using a rigid grid, even with a baseline model only fine-tuned for classification ("C-Full", i.e. without ranking loss). On the Oxford 5k data, the improvements brought by the ranking loss and by the proposals are complementary, increasing the accuracy from 74.8 mAP with the C-Full model and a rigid grid up to 83.1 mAP with ranking loss and 256 proposals per image.

TABLE 1

Retrieval results measured in mAP

| Dataset | Training Phase 1 | Training Phase 2 | | | | |
|---|---|---|---|---|---|---|
| | | Rigid grid | RPN - # of proposed regions | | | |
| | | | 16 | 32 | 64 | 128 |
| Oxford 5k | C-Full | 75.3 | 77.5 | 77.8 | 78.7 | 78.8 |
| Oxford 5k | C-Full; R-Clean | 78.6 | 81.0 | 80.9 | 81.4 | 81.3 |
| Paris 6k | C-Full | 82.2 | 83.7 | 84.6 | 85.3 | 85.6 |
| Paris 6k | C-Full; R-Clean | 84.5 | 84.5 | 85.0 | 85.3 | 85.5 |

Further experiments (not shown) were performed to compare the disclosed approach with other methods that also compute global image representations without performing any form of spatial verification or query expansion at test time. It was found that the disclosed approach significantly outperformed the other tested methods on all datasets, by up to 15 mAP points in some comparisons.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing device comprising:
an electronic processor; and
a non-transitory storage medium operatively connected with the electronic processor and storing instructions readable and executable by the electronic processor to perform a method for detecting an object in an input image by operations including:
generating an input image vector representing the input image by applying to the input image an image processing network including applying a convolutional neural network (CNN) to the input image to generate an input image CNN response map, defining regions of the input image CNN response map by applying a region proposal network (RPN) to the input image CNN response map, generating a region vector representing each region of the input image CNN response map, and sum-aggregating the region vectors representing the regions of the input image CNN response map;
for a reference image that is different from the input image and that depicts the object, generating a reference image vector representing the reference image by applying to the reference image the same image processing network as applied to the input image including applying the CNN to the reference image to generate a reference image CNN response map, defining regions of the reference image CNN response map by applying the RPN to the reference image CNN response map, generating a region vector representing each region of the reference image CNN response map, and sum-aggregating the region vectors representing the regions of the reference image CNN response map;
computing a similarity metric between the input image vector and the reference image vector; and
detecting the object in the input image if the similarity metric satisfies a detection criterion.

2. The image processing device of claim 1 wherein generating each region vector includes max pooling activation features in the corresponding region of the CNN response map.

3. The image processing device of claim 2 wherein generating each region vector further includes whitening the output of the max-pooling.

4. The image processing device of claim 1 wherein the region vectors representing the regions of the input image CNN response map, the region vectors representing the regions of the reference image CNN response map, the input image vector representing the input image, and the reference image vector representing the reference image are all of the same length.

5. The image processing device of claim 1 wherein the RPN comprises a fully convolutional network.

6. The image processing device of claim 1 wherein:
the generating of the input image vector representing the input image is performed as a single forward pass through the CNN and RPN and does not include any back-propagation; and the generating of the reference image vector representing the reference image is performed as a single forward pass through the CNN and RPN and does not include any back-propagation.

7. The image processing device of claim 1 wherein the similarity metric is a dot product.

8. The image processing device of claim 1 wherein the non-transitory storage medium further stores instructions readable and executable by the electronic processor to perform a training method for training the CNN and the RPN, the training method including:
   (i) training the CNN by operations including performing the method for detecting an object with the RPN replaced by fixed regions; and
   (ii) training the RPN using the CNN trained in the operation (i).

9. The image processing device of claim 8 wherein the operation (i) employs a three-stream Siamese network that optimizes a triplet ranking loss for training the CNN.

10. The image processing device of claim 1 wherein the object is one of a person, an item, or a virtual reality object.

11. The image processing device of claim 1 wherein the non-transitory storage medium further stores instructions readable and executable by the electronic processor to perform a training method for training the CNN and the RPN, the training method including:
   training the CNN by operations including performing the method for detecting an object with the RPN replaced by fixed regions by employing a network that optimizes a triplet ranking loss for training the CNN.

12. The image processing device of claim 1 wherein the non-transitory storage medium further stores instructions readable and executable by the electronic processor to perform a training method for training the CNN and the RPN, the training method including:
   training the CNN by operations including performing the method for detecting an object with the RPN replaced by fixed regions by employing a network that maximizes a function with an input of a scalar that controls a margin.

13. The image processing device of claim 1 wherein the similarity metric is a Euclidean distance.

14. A method, performed by one or more processors, comprising:
   generating an input image vector representing an input image by applying to the input image an image processing network including applying a convolutional neural network (CNN) to the input image to generate an input image CNN response map, defining regions of the input image CNN response map by applying a region proposal network (RPN) to the input image CNN response map, generating a region vector representing each region of the input image CNN response map, and sum-aggregating the region vectors representing the regions of the input image CNN response map;
   for a reference image that is different from the input image and that depicts the object, generating a reference image vector representing the reference image by applying to the reference image the same image processing network as applied to the input image including applying the CNN to the reference image to generate a reference image CNN response map, defining regions of the reference image CNN response map by applying the RPN to the reference image CNN response map, generating a region vector representing each region of the reference image CNN response map, and sum-aggregating the region vectors representing the regions of the reference image CNN response map;
   computing a similarity metric between the input image vector and the reference image vector; and
   detecting the object in the input image if the similarity metric satisfies a detection criterion.

* * * * *